(12) United States Patent
Kumar et al.

(10) Patent No.: US 12,445,699 B2
(45) Date of Patent: Oct. 14, 2025

(54) ENERGY MANAGEMENT OF CAMERAS IN AN ENVIRONMENT

(71) Applicant: DRAGONFRUIT AI, INC., Menlo Park, CA (US)

(72) Inventors: Amit Kumar, Menlo Paek, CA (US); Vishal Goel, Bangalore (IN)

(73) Assignee: DRAGONFRUIT AI, INC., Menlo Park, CA (US)

(*) Notice: Subject to any disclaimer, the term of this patent is extended or adjusted under 35 U.S.C. 154(b) by 42 days.

(21) Appl. No.: 18/192,843

(22) Filed: Mar. 30, 2023

(65) Prior Publication Data

US 2024/0334029 A1    Oct. 3, 2024

(51) Int. Cl.
| | |
|---|---|
| H04N 23/13 | (2023.01) |
| H04N 23/60 | (2023.01) |
| H04N 23/61 | (2023.01) |
| H04N 23/617 | (2023.01) |
| H04N 23/63 | (2023.01) |
| H04N 23/68 | (2023.01) |
| H04N 23/90 | (2023.01) |

(52) U.S. Cl.
CPC ............. *H04N 23/13* (2023.01); *H04N 23/61* (2023.01); *H04N 23/617* (2023.01); *H04N 23/635* (2023.01); *H04N 23/64* (2023.01); *H04N 23/6812* (2023.01); *H04N 23/90* (2023.01)

(58) Field of Classification Search
CPC ...... H04N 23/13; H04N 23/61; H04N 23/617; H04N 23/635; H04N 23/64; H04N 23/6812; H04N 23/90
See application file for complete search history.

(56) References Cited

U.S. PATENT DOCUMENTS

| | | | | |
|---|---|---|---|---|
| 10,742,936 | B2* | 8/2020 | Liu | ............... H04N 7/181 |
| 10,902,540 | B2* | 1/2021 | Ross | .............. G06F 18/22 |
| 2013/0135444 | A1* | 5/2013 | Stein | ............. G08G 1/167 |
| | | | | 348/148 |
| 2019/0156495 | A1* | 5/2019 | Altuev | ........... H04W 4/029 |
| 2020/0098122 | A1* | 3/2020 | Dal Mutto | ...... H04N 23/60 |
| 2020/0145623 | A1* | 5/2020 | Sadanand | ......... G06V 20/46 |
| 2024/0111975 | A1* | 4/2024 | Barkan | ........... G06K 7/10722 |

* cited by examiner

*Primary Examiner* — Hung H Lam (57) ABSTRACT

Systems, methods, and software to manage energy resource usage by cameras in an environment. In one implementation, a management service monitors motion of objects in an environment using a plurality of cameras. The management service further identifies when one or more objects enter a field of view for a camera and, subsequently, identifies when one or more objects leave the field of view for the camera. Once the one or more objects leave the field of view, the management service can initiate or notify the camera to take at least one image.

20 Claims, 5 Drawing Sheets

ENERGY MANAGEMENT OF CAMERAS IN AN ENVIRONMENT

BACKGROUND

Video data generated from cameras can provide insight about a variety of different environments, including businesses, residences, nature, or some other environment. As the information is obtained, the video data can be processed or viewed by different users to identify relevant events in the environment. The events can include monitoring movements of people within a store, identifying potential crimes in a store, or providing some other operation in association with the video data.

As the number of cameras deployed within an environment increase, difficulties can arise in managing the hardware and software configurations of the various devices. As an example, cameras deployed to provide surveillance a store can each include a battery that is required to be recharged or replaced. This can cause an increased burden on personnel to replace or recharge the batteries or can cause portions of the cameras to be offline if a battery is not replaced on the required schedule.

OVERVIEW

Provided herein are systems, methods, and software to manage the energy use of cameras in an environment. In one example, a method of operating a management service for an environment includes monitoring motion of objects in the environment using a plurality of sensors. The method further includes identifying when one or more objects of the objects enter a field of view for a camera based on the monitored motion and identifying when the one or more objects leave the field of view or clear for the camera based on the monitored motion. The method further includes, in response to identifying when the one or more objects leave the field of view for the camera, initiating a capture of at least one image by the camera.

In some implementations, after the image is captured, the method further provides for determining an update to stock information for the environment based on the image, wherein the stock information comprises quantities associated with items in the environment. In some examples, the update can be determined based at least in part on one or more previous images taken prior to the one or more objects entering the field of view for the camera.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
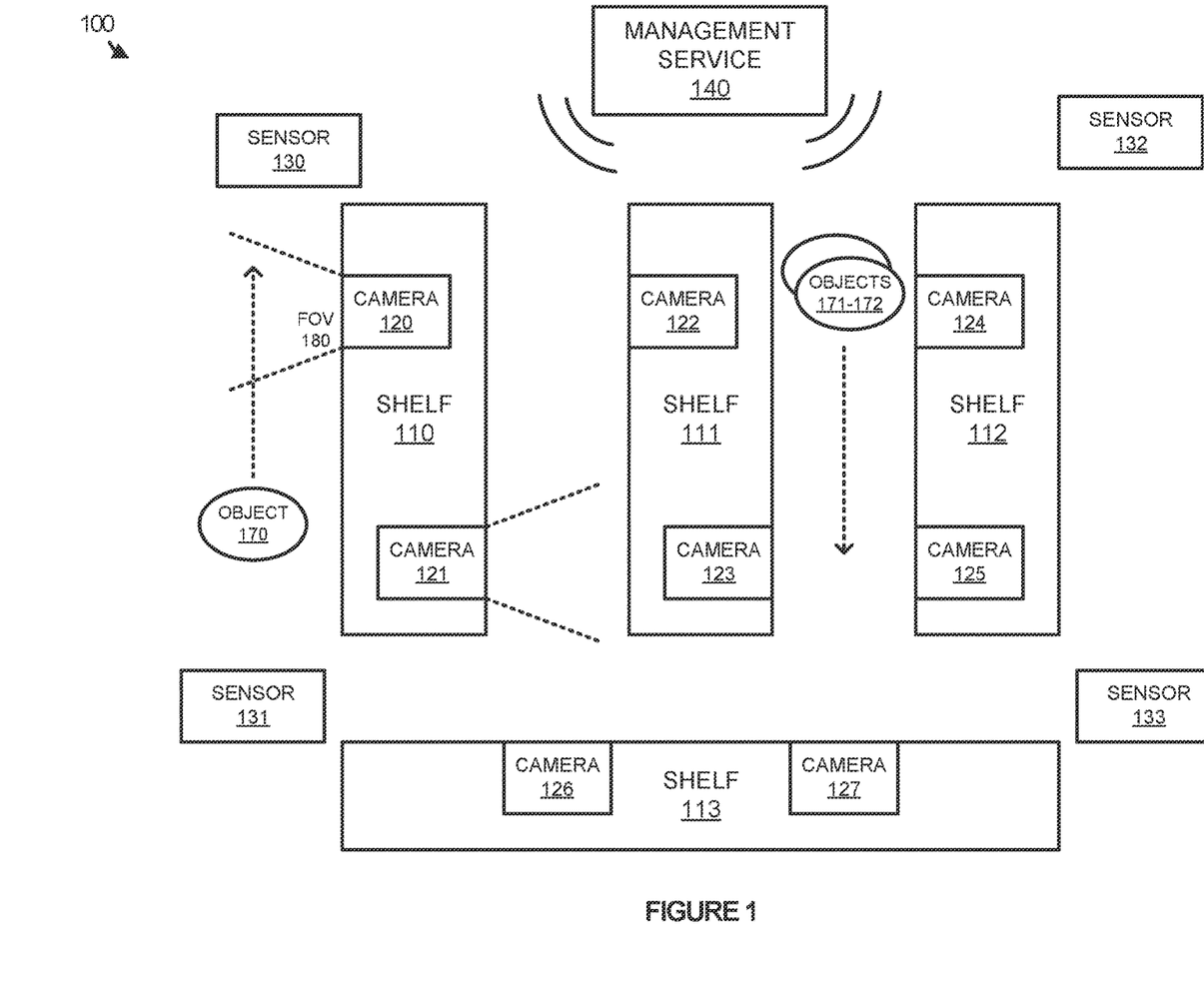
FIG. 1 illustrates an environment to manage energy resource usage associated with cameras according to an implementation.

FIG. 1 illustrates an environment 100 to manage energy resource usage associated with cameras according to an implementation. Environment 100 includes shelves 110-113 representative of shelves in a retail environment, such as a convenience store, grocery store, hardware store, or some other retail environment. Environment 100 further includes cameras 120-127, sensors 130-133, objects 170-172, and management service 140. Management service 140 can communicate using wired connections or wireless connections with cameras 120-127 and sensors 130-133. Sensors 130-133 can represent additional cameras, motion sensors, or some other device capable of detecting movement of objects within environment 100. Although demonstrated in the example of environment 100 as using a retail environment, management service 140 can be used to initiate image capture from cameras 120-127 in any other environment based on movement detected in by one or more other sensors.

In environment 100, cameras 120-127 are used to capture information about the environment, such as stock updates for items in the environment (e.g., products, equipment, and the like), theft identification of items in the environment, or some other information associated with the environment. For example, cameras 120-127 can be positioned to monitor different portions of shelves 110-113 to identify stock of items on the shelves. In at least one implementation, the images from two different periods can be compared to identify changes in the stock as a function of time.

To manage the capture of the images from cameras 120-127, management service 140 is provided. Management service 140 uses information from sensors 130-133 to monitor the movement of objects, such as objects 170-172 in environment 100. Management service 140 can execute using one or more computers can be located locally to the environment (e.g., on the same local network as sensors 130-133 and cameras 120-127 or in the same physical location as sensors 130-133 and cameras 120-127), can be located remotely (e.g., in a datacenter or centralized location), or can be in some combination of locally and remotely. Sensors 130-133 can gather and provide to management service 140 video data, motion activity data, or some other data associated with environment 100. For example, sensors 130-133 can represent additional video cameras that can track the movement of objects 170-172 in environment 100. In at least one example, an administrator associated with the environment can provide a layout specification, indicating locations of cameras 120-127 and associated fields of view associated with the cameras for sensors 130-133. Thus, when an object of objects 170-172 enters a portion of the environment that is identified as a field of view for a camera in the layout specification, management service 140 can identify the entry by the object and further monitor when the object leaves the field of view for the camera.

As an illustrative example, objects 171-172 are moving between shelf 111 and shelf 112, sensors 130 and/or 132 can provide information about the movement of the objects and provide the information (e.g., video data) to management service 140. Management service 140 can determine that objects 171-172 enter the field of view for camera 124 based on the information from the one or more sensors and the layout specification. Additionally, management service 140 can determine that objects 171-172 have left the field of view based on the information from the sensors and the layout specification. Once management service 140 determines that the field of view is free from objects, such as moving people, carts, robots, or other objects, management service 140 can trigger camera 124 to capture at least one image.

Management service 140 can process the at least one image to provide information about the stock of items in environment 100. For example, camera 124 can be used to determine whether an item is out of stock on shelf 111. In some implementations, management service 140 can compare the at least one image captured by camera 124 to a previously captured image by camera 124 to determine one or more differences between the images (e.g., items missing). From the identified one or more differences, management service 140 can update stock information for environment 100. In another implementations, management service 140 can determine whether an item stock falls below a threshold based on a sign or other identifier within the image to indicate that stock of a corresponding item is running low. Management service 140 can further generate a summary of the stock information, wherein the summary can be generated when the stock information satisfies one or more criteria, can be generated at the request of a user, or generated at some other interval.

In some implementations, management service 140 can monitor when a threshold quantity of objects has entered and left the field of view associated with a camera. When the threshold has entered and left the field of view, management service 140 can trigger the capture of an image from the camera. For example, when a threshold number of objects have passed within field of view 180 associated with camera 120, management service 140 can trigger the capture of the image and process the image data.

Figure 2:
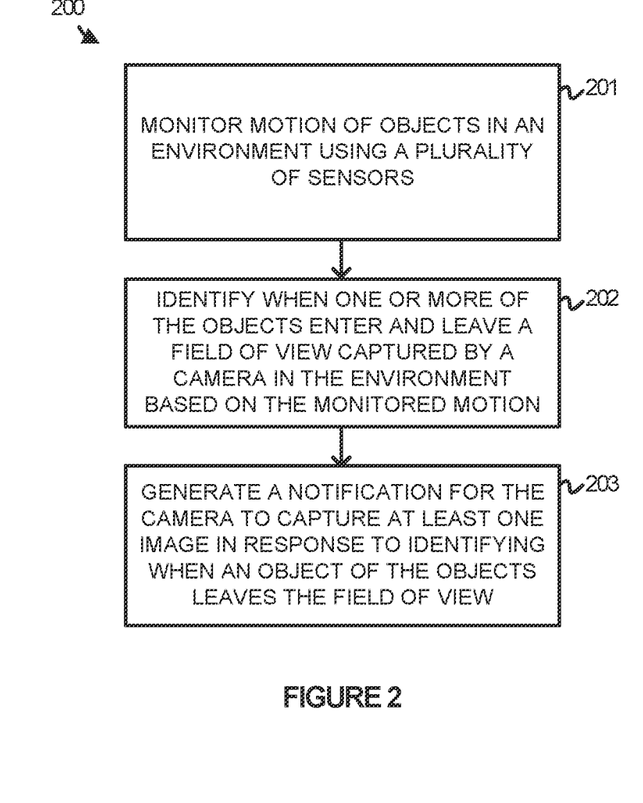
FIG. 2 illustrates an operation of a management service to manage resource usage of cameras in an environment according to an implementation.

FIG. 2 illustrates an operation 200 of a management service to manage resource usage of cameras in an environment according to an implementation. The steps of operation 200 are referenced parenthetically in the paragraphs that follow with reference to systems and elements of computing environment 100. Specifically, the steps of operation 200 will be exemplified in relation to management service 140 that can execute across one or more computers.

For operation 200, management service 140 monitors (201) motion of objects in an environment using a plurality of sensors. The sensors can comprise cameras that capture video data, motion sensors, or some other sensor device capable of monitoring the movement of objects in an environment. The objects can comprise people, carts, strollers, scooters, cars, bikes, robots, or some other moveable object. Management service 140 can identify any moving object in environment 100 or can identify only objects that satisfy one or more criteria. For example, management service 140 will only monitor the movement of people within environment 100 and ignore the movement of other objects within environment 100. People can be identified based on shape, color, movement characteristics, or some other trait from the objects in the environment.

While management service 140 monitors the movement of objects in the environment, operation 200 further identifies (202) when one or more of the objects enter and leave a field of view captured by a camera in the environment based on the monitored motion. In some implementations, operation 200 is used to determine when the field of view for the camera does not include any objects and then identify when objects are in the field of view. Referring to the example in environment 100, sensors 130-133 may provide information about the movement of object 170 and management service 140 will determine when the field of view 180 associated with camera 120 goes from not including an object to including one or more objects. Management service 140 then uses the information from the sensors to determine when the one or more objects leave the field of view 180 for camera 120 leaving no remaining objects.

Once the field of view is empty for the camera, management service 140 generates (203) a notification for the camera to capture at least one image in response to the one or more objects leaving the field of view. The at least one image can be communicated to management service 140 following the at least one image being captured, can be provided at periodic intervals, can be provided when specific information is identified in the image, or can be identified at some other interval. As an example, camera 120 can include a processing system (processor, memory, storage, etc.) to process the image and determine whether one or more criteria are met for the image. The one or more criteria can include the absence of one or more items expected in the image, the addition of one or more items expected in the image, or some other criteria. If the criteria are not met, then the image will not be communicated to management service 140. However, if the criteria are met the image can be communicated to management service 140 and/or any additional information associated with the image (e.g., the removal or addition of an object). In other implementations, the image is provided to management service 140 and management service 140 can process the at least one image captured by the camera.

In some implementations, rather than using an external management service 140, cameras 120-125 can include processor hardware and memory to support the determination of image capture. In at least one example, a camera can wake at intervals and determine whether an object is in the field of view for the camera. This determination can be made via a capture of the image to identify whether an object is in the captured image. If an object is in the captured image, then an action is taken to prevent the image from being stored locally or communicated to an external image processing service (e.g., management service 140). Advantageously, by preventing the communication of the image or the storage of the image, resources, such as battery and processor resources can be preserved by the camera. Alternatively, if no object is present in the image, then the image can be saved locally and/or communicated to management service 140. In some examples, the processing of the image can occur locally to determine changes in inventory, however, the operations can be performed externally using management service 140. Images without objects in the field of view can be transmitted periodically, upon capture, or at some other interval.

Figure 3:
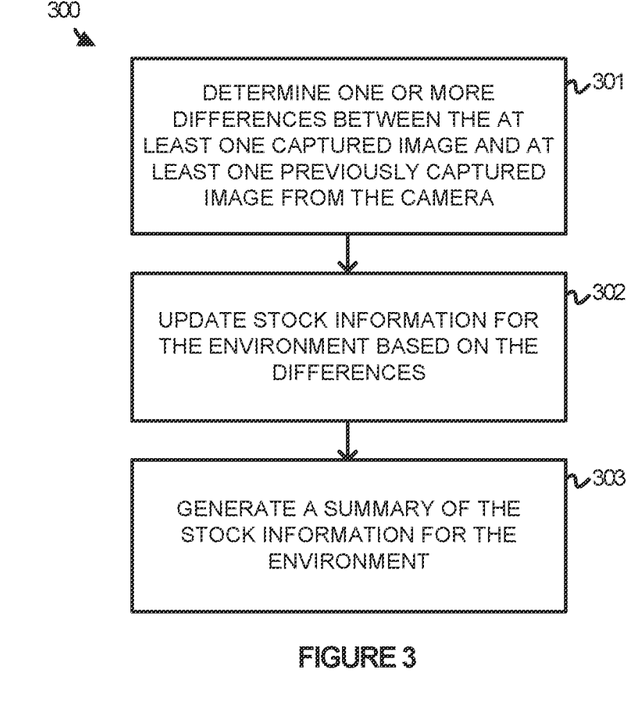
FIG. 3 illustrates an operation of a management service to identify differences between images according to an implementation.

FIG. 3 illustrates an operation 300 of a management service to identify differences between images according to an implementation. The steps of operation 300 are referenced parenthetically in the paragraphs that follow with reference to systems and elements of computing environment 100. Specifically, the steps of operation 300 will be exemplified in relation to management service 140 that can execute across one or more computers. Although demonstrated as being provided entirely at management service 140, some of the operations can be implemented at each of the individual cameras.

For operation 300, management service 140 determines (301) one or more differences between the at least one image captured by the camera in response to the objects leaving the field of view and at least one image captured previously from the camera. The at least one previous image can comprise an image that was captured by the camera prior to the one or more objects entering the field of view of the camera. For example, camera 124 can capture a first image prior to objects 171-172 entering the field of view for the camera and can capture a second image after objects 171-172 leave the field of view for camera 124. In some examples, the two images that are compared can comprise the most recently captured images for camera, wherein a first image comprises an image taken prior to the objects entering the field of view and the second image comprises an image taken after the objects leave the field of view.

After the one or more differences are determined, operation 300 updates (302) stock information for the environment based on the one or more differences. The stock information can indicate the quantity of one or more items visible in the field of view. For example, camera 124 can provide information about items that are located on shelf 111 and can determine when items are running low or absent and can update the stock information associated with the visible items. Similar operations can be performed by the other cameras in environment 100 to identify stock information for other items in the environment.

From the updated stock information, operation 300 further generates (303) a summary of the stock information for the environment. The summary can be generated at the request of a user, can be generated when one or more items satisfy criteria, or can be generated at some other interval. For example, images from camera 124 can indicate that the quantity of an item falls below a threshold (e.g., zero remaining). In response to identifying that the quantity falls below the threshold, a summary can be generated that indicates an identifier for the item, the location of the item, or some other information associated with the item. The summary can be provided via an application, via a text, an email, or some other notification.

Although demonstrated in the example of FIG. 3 as comparing different images to determine stock updates for the environment, management service 140 can determine updates based on the presence of attributes in an image. For example, an image can be processed to determine whether a sign (e.g., "empty") is present in the image for an item and can update the stock information for the item if the sign is visible in the image.

Figure 4:
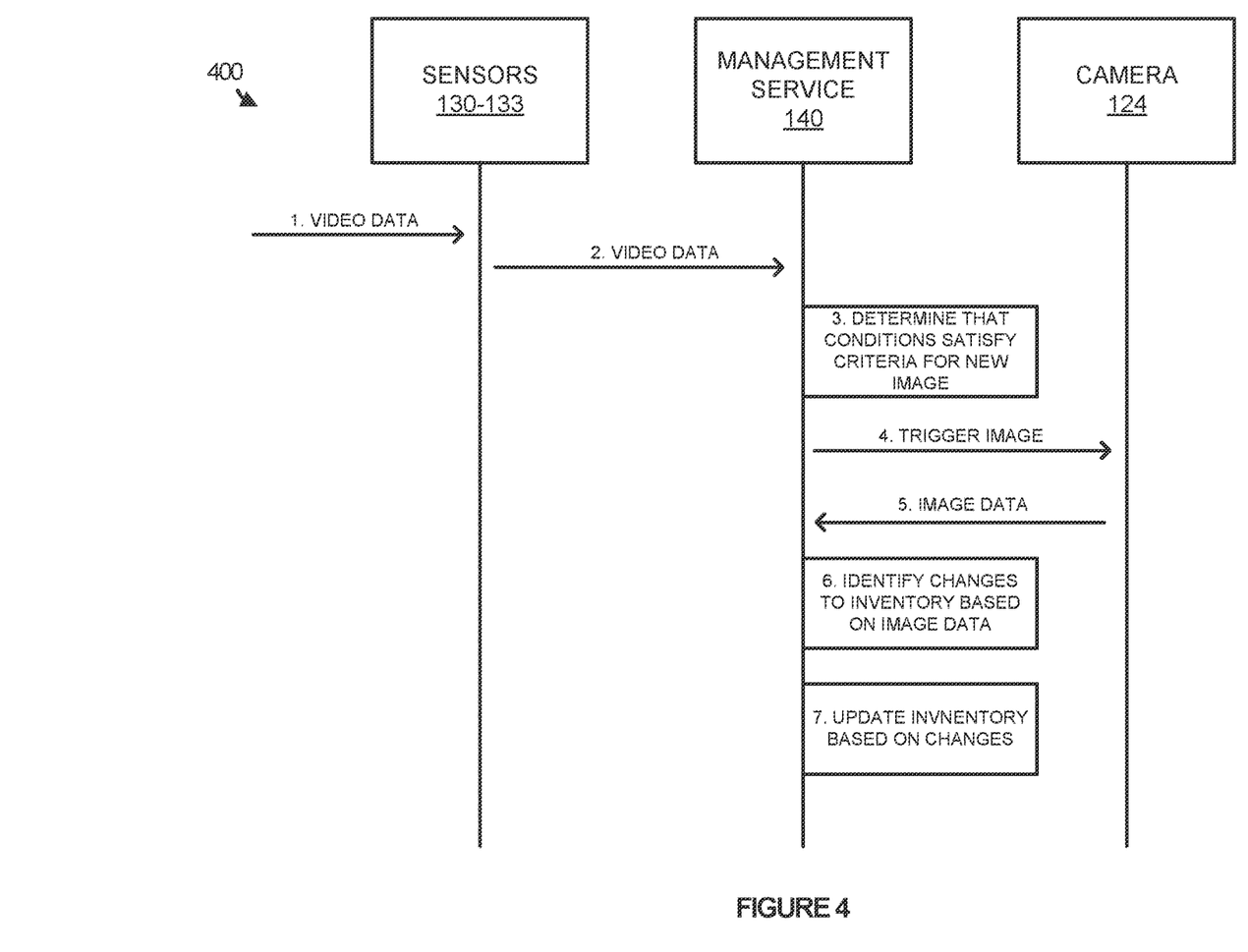
FIG. 4 illustrates a timing diagram to trigger image capture and compare images to identify stock updates according to an implementation.

FIG. 4 illustrates a timing diagram 400 to trigger image capture and compare images to identify stock updates according to an implementation. Timing diagram 400 includes sensors 130-133, management service 140, and camera 124 from environment 100 of FIG. 1.

In operational scenario 400, sensors 130-133 represent cameras that capture video data at step 1 and provide the video data to management service 140 at step 2. Management service 140 determines that the conditions in the video data satisfy criteria to capture a new image by camera 124. In at least one implementation, management service 140 will determine when at least one object moves into the field of view and leaves the field of view for camera 124, such that the field of view is clear of all objects. Management service 140 can determine that the conditions or criteria are satisfied each time that an object or objects enter the field of view and exit the field of view. For example, when objects 171-172 enter the field of view for camera 124, management service 140 can wait for the objects to leave the field of view to satisfy the condition. In another example, management service 140 will determine when a quantity of objects pass through the field of view of camera 124. For example, management service 140 will identify the condition as satisfied once five objects have entered and left the field of view for camera 124.

Once the condition is satisfied, management service 140 triggers the capture of an image at step 4 and the image data is returned at step 5. The image data can be communicated immediately, at periodic intervals, or at some other interval. In response to receiving the image data, management service 140 identifies changes to the inventory based on the image data at step 6. In at least one implementation, management service 140 will determine whether a sign or other mark is visible in the image to indicate an update associated with an item in the image. For example, on a shelf, products can be organized and lined up in front of a sign that indicates that the items are low or empty. When the sign is visible (i.e., the items are low are empty), management service 140 can update the inventory to indicate the status associated with the item. In another example, management service 140 can compare the most recently captured image to a previously captured image to determine whether any changes are identifiable in association with the stock information for an item (e.g., one or more items removed). The differences can then be used to update the stock information for the environment at step 7, wherein the stock information can comprise the totality of information for items monitored via the plurality of cameras for the environment.

In some implementations, the inventory of items can be used to generate a summary that is provided to an administrator of the environment. The summary can be generated periodically, after a request from the administrator, when the quantity of items satisfies one or more criteria, or at some other interval. The summary can indicate the items that are out of stock, stock associated with all the items, or some other stock information for the environment. As an example, when management service 140 determines that an image from camera 124 indicates that an item is out of stock, management service 140 will generate a notification to an administrator indicating the item is out of stock. Alternatively, management service 140 can order replacements for the item or provide some other action in association with the stock of the items.

In some implementations, rather than triggering the capture of images using sensors 130-133 and management service 140, camera 124 can be used to determine whether a picture contains an object. As an example, camera 124 can periodically turn to an active or on state from a sleep or off state. Following the turn to an active state, camera 124 can capture an image and determine whether an object is in the field of view for the camera. If no object is present in the field of view (e.g., robot, person, etc.), the camera can save the image, can transmit the image to management service 140, or can provide some other operation to support the determination of item stock in the image. For example, if no object is detected in the image, camera 124 can communicate the image to management service 140 for processing. If at least one object is detected in the field of view for the camera 124, then camera 124 can prevent the communication and saving of the image. Advantageously, battery and processing resources can be reserved for the camera when an object is at least partially obstructing the view of items monitored by the camera. Additionally, if an object is present, camera 124 can set a new activation timer to take a second image that permits a second image to be taken when the object moves out of the field of view. As an example, camera 124 can be configured to capture an image every 30 minutes and store and/or transmit the image when no objects are in the field of view. If an object is in the field of view, a new timer is initiated that takes a second image one minute later. The process can be repeated as necessary to obtain a picture without an obstructing object (i.e., attempt image capture every minute until a usable photo is identified). Once identified, the image can be stored, communicated, further processed to identify stock information, or provide some other operation in association with the image. Thus, only images that are collected without an object in the field of view will have additional processing, be stored, or be transmitted, while any photo that is collected with an object in the field of view (blocking the stock information) will be provided limited processing to identify whether an object interferes with the desired collection of data.

Figure 5:
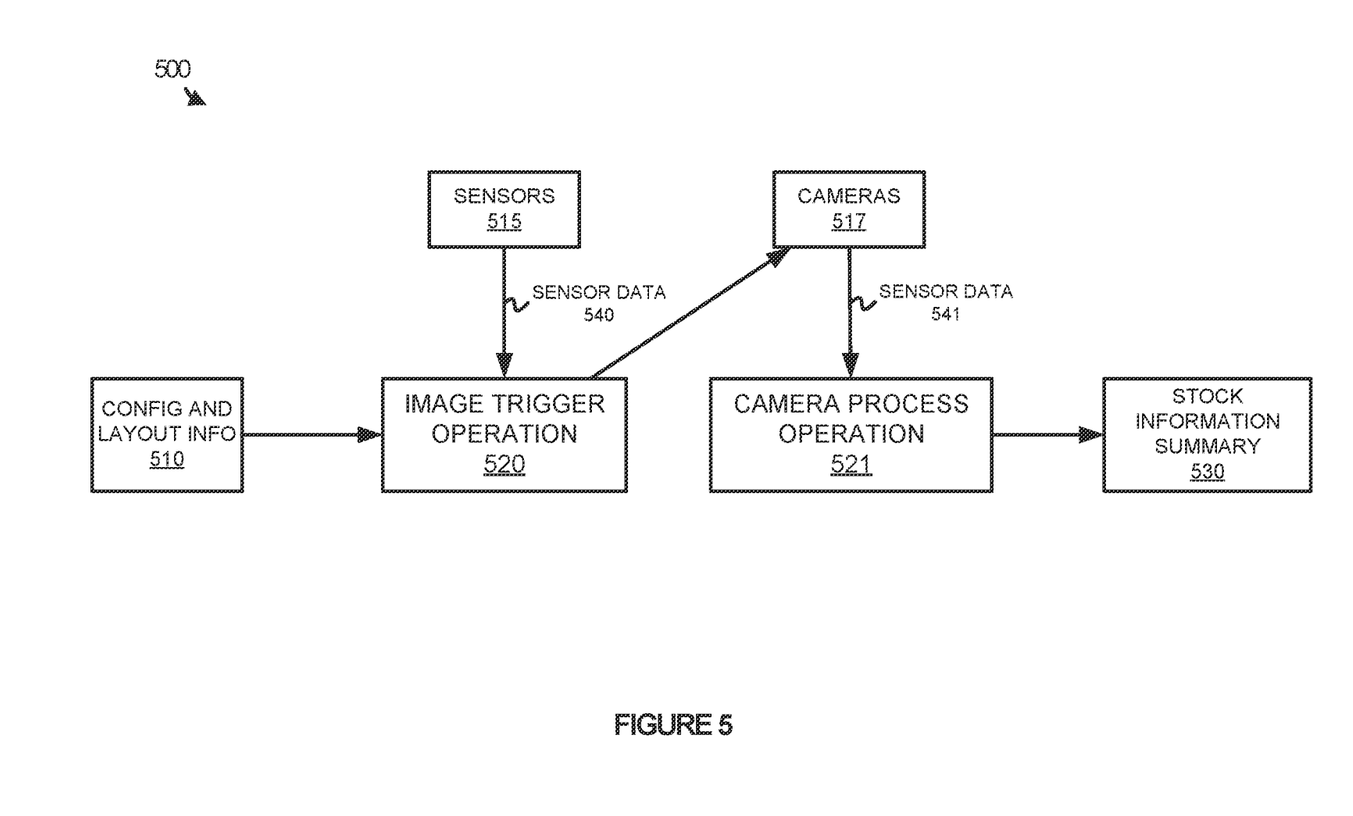
FIG. 5 illustrates an operational scenario of generating a layout specification for an environment according to an implementation.

FIG. 5 illustrates an operational scenario 500 of generating a layout specification for an environment according to an implementation. Operational scenario 500 includes configuration and layout information 510, sensors 515, cameras 517, stock information 530 and sensor data 540-541. Operational scenario 500 further includes image trigger operation 520 and camera process operation 521 that are representative of operations that can be provided by a management service, such as management service 140 of FIG. 1.

In operational scenario 500, an administrator of an environment can provide configuration and layout information 510, wherein the layout information can identify what object actions (e.g., person movement) within an environment can trigger the capture of images by cameras 517. In at least one example, sensors 515 can represent video cameras that can capture video data and provide the video data to the management service. From the video data, the administrator can indicate locations that correspond to fields of view for cameras 517. For example, using a first sensor of sensors 515, the examiner can indicate portions in the frame that correspond to a camera of cameras 517. Accordingly, the management service can monitor the movement of objects (e.g., people) and determine when the objects enter the field of view for the camera based on the definitions provided from the administrator as part of configuration and layout information 510. Although demonstrated using camera, other types of sensors, such as motion sensors, can be used to define areas related to the field of view of a camera. For example, a motion sensor can define when a person enters a field of view associated with a camera and a second motion sensor can define when the person leaves the field of view.

From sensor data 540 and configuration and layout information 510, image trigger operation 520 determines when sensor data satisfies criteria to trigger image captures from cameras 517. In at least one implementation, image trigger operation will determine when a quantity of objects enters and leaves the field of view for the camera. For example, five people can enter the field of view for a camera and leave the field of view for the camera. When the five people leave, operation 520 can trigger a camera of cameras 517 to capture an image that is provided back to camera process operation 521 as sensor data 541. Camera process operation 521 processes the image data to determine stock information for items captured in the camera field of view. The processing can include comparing a most recent image to a previously captured image, can include identifying a stock identifier in an image (e.g., sign), or can include some other processing of the image. Based on sensor data 541 from cameras 517, camera process operation 521 can generate stock information summary 530 for items in an environment. Stock information summary 530 can include stock information for items in the environment, indicate one or more items that are out of stock or meet criteria indicating a low quantity of the items, or provide some other information about the stock in the environment. In at least one example, the summary is generated with the stock associated with one or more items satisfies criteria (e.g., no stock remains). In other examples, the summary can be generated per the request of the administrator associated with the environment, at periodic intervals, or at some other interval. The summary can be provided via a dedicated application, a web interface, an email, a text message, or some other communication mechanism.

Figure 6:
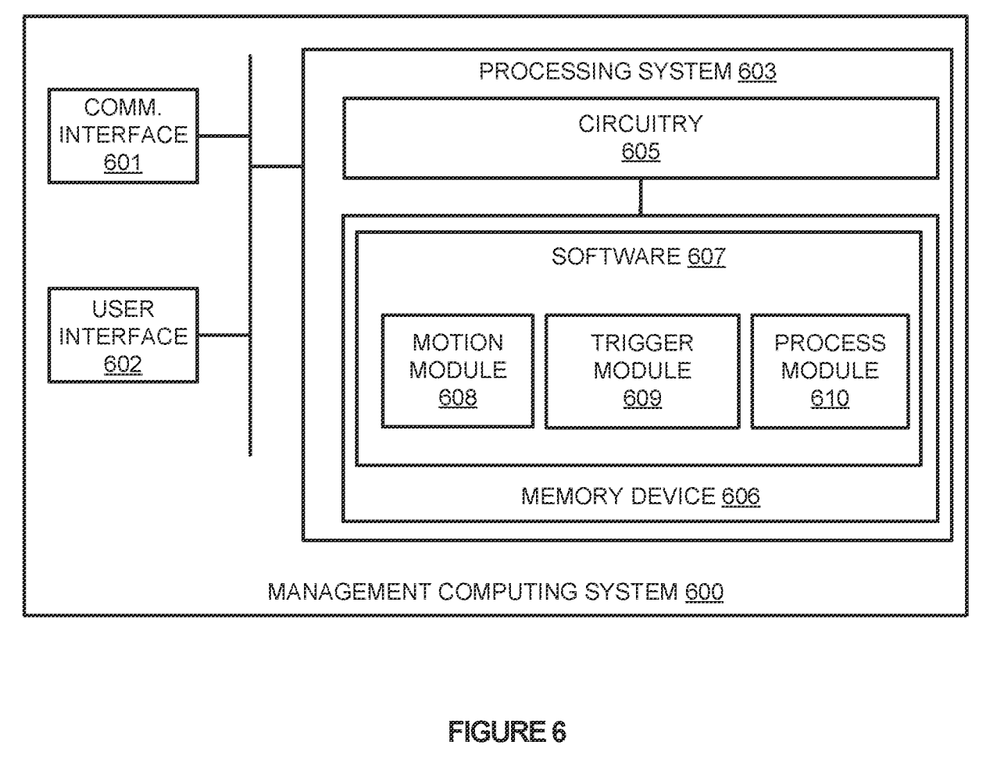
FIG. 6 illustrates a management computing system to manage image capture and stock updates according to an implementation.

FIG. 6 illustrates a management computing system 600 to manage image capture and stock updates for an environment according to an implementation. Computing system 600 is representative of any computing system or systems with which the various operational architectures, processes, scenarios, and sequences disclosed herein for a management service, such as management service 140 of FIG. 1. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, management service 142 can communicate with sensors and cameras in an environment. In some examples, management service 142 can further communicate with a cloud processing service or other computers capable of performing image and video processing. Management service 142 can also communicate with a controller and/or console device to receive configuration information and provide summary information to an administrator.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. In some implementations, user interface 602 may permit a user to request and process various video data stored in multiple storage locations. User interface 602 may be omitted in some examples.

Processing circuitry 605 comprises microprocessor and other circuitry that retrieves and executes operating software 607 from memory device 606. Memory device 606 may include volatile and nonvolatile, removable, and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes use module 608, requirement module 609, and schedule module 610, although any number of software modules may provide the same operation. Operating software 607 may further include an operating system, utilities, drivers, network interfaces, applications, or some other type of software. When executed by processing circuitry 605, operating software 607 directs processing system 603 to operate computing system 600 as described herein. In at least one example, operating software 607 directs processing system 603 to implement operations 200 and/or 300 described above with respect to FIGS. 2 and 3.

In one implementation, motion module 608 directs processing system 603 to monitor the motion of objects in the environment using a plurality of sensors, wherein the sensors can comprise cameras, motion sensors, or some combination thereof. Motion module 608 further directs processing system 603 to determine when one or more objects have entered the field of view for a camera and have left the field of view for the camera. In some examples, motion module 608 may determine when a threshold number of objects have entered the field of view for a camera and left the field of view for the camera (e.g., ten people entering and leaving the field of view). In other examples, a single object (e.g., person) entering and leaving the field of view can satisfy the criteria for an image.

Once the one or more objects have entered and left the field of view of a camera, trigger module 609 directs the camera to capture at least one image in the field of view. Once captured, the at least one image is provided to management computing system 600, wherein process module 610 directs processing system 603 to determine stock information based on the at least one image. In at least one example, the process module 610 can perform image processing to determine whether one or more stock indicators are visible in the at least one image. The stock indicators can comprise signs that indicate the absence of an item, a low stock of an item, or some other sign indicating the quantity associated with an item. In another example, process module 610 can compare the most recently captured image with an image taken prior to the one or more objects entering the field of view for the camera. The comparison can identify changes in stock for one or more items captured in the image. For example, a camera can be positioned such that the field of view captured a plurality of items on a shelf. Process module 610 can receive the image and compare the image to a previously captured image to determine stock information for the plurality of items, including decreasing stock or increasing stock. The information can then be used to update the stock information associated with the environment, wherein the information for the environment can include stock information associated with the totality of the items in the environment.

From the updated stock information, process module 610 can direct processing system 603 to generate a summary of the stock information. The summary can be generated per the request of an administrator or user associated with the environment, can be generated at periodic intervals, can be generated when the stock of one or more items satisfy one or more criteria, or can be generated at some other interval. As an example, when the stock information associated with an item indicates the quantity of the item falls below a threshold value, a notification can be generated and delivered to a user associated with the environment. The notification can be delivered via an application, text, or some other process.

In some examples, in addition to, or in place of generating a summary for an administrator of an environment, process module 610 can direct processing system 603 to take a remediation operation in association with the stock associated with one or more items. The remediation operation can include ordering additional items, notifying personnel associated with stocking the corresponding item, or providing some other notification.

In some implementations, trigger module 609 can direct processing system 603 to perform image capture in an environment at periodic intervals. For example, an administrator associated with a store can capture stock information at multiple points during the day (e.g., morning, afternoon, night). When the time to capture at the various cameras occurs, trigger module 609 can direct processing system 603 to determine whether the field of view is clear for the camera. If the field of view is clear, the image can be captured and used to determine stock information for items in the field of view as described herein. If the field of view is not clear (i.e., people are in the field of view of the camera), then a delay can be used to capture the image once the field of view is clear. Advantageously, energy can be saved from the avoidance of capturing unnecessary images that do not provide desired information about the status of items in an environment. The captured video data can be communicated back to computing system 600 when the image is captured, at defined periodic intervals, or at some other interval.

The included descriptions and figures depict specific implementations to teach those skilled in the art how to make and use the best option. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:
1. A method comprising:
monitoring motion of objects in an environment using a plurality of sensors;
identifying when one or more objects of the objects enter a field of view for a camera based on the monitored motion;
identifying when the one or more objects leave the field of view for the camera based on the monitored motion; and in response to identifying when the one or more objects leave the field of view for the camera, initiating a capture of at least one image by the camera.

2. The method of claim 1, wherein the plurality of sensors comprises a plurality of cameras separate from the camera.

3. The method of claim 1, wherein the plurality of sensors comprises a plurality of motion sensors.

4. The method of claim 1 further comprising:
determining one or more differences between the at least one image and at least one additional image, wherein the at least one additional image was captured prior to identifying when the one or more objects enter the field of view for the camera; and
updating stock information for the environment based on the one or more differences.

5. The method of claim 4 further comprising generating a summary of the stock information for the environment.

6. The method of claim 5 further comprising:
determining that the stock information associated with at least one item in the environment satisfies one or more criteria; and
wherein generating the summary of the stock information for the environment occurs in response to determining that the stock information associated with the at least one item in the environment satisfies the one or more criteria.

7. The method of claim 1, wherein the objects comprise people or robots.

8. The method of claim 1, wherein identifying when the one or more objects leave the field of view for the camera based on the monitored motion comprises:
identifying when the one or more objects leave the field of view for a threshold period.

9. The method of claim 1 further comprising determining an update to stock information for the environment based on the image, wherein the stock information comprises quantities associated with items in the environment.

10. The method of claim 1 further comprising:
obtaining a layout specification for the environment, wherein the layout specification indicates at least a location of the camera relative to the plurality of sensors; and
wherein monitoring the motion of the objects in the environment using the plurality of sensors comprises monitoring the motion of the objects in the environment using the plurality of sensors and the layout specification.

11. A computing apparatus comprising:
a storage system;
a processing system operatively coupled to the storage system; and
program instructions stored on the storage system that, when executed by the processing system, direct the computing apparatus to:
monitor motion of objects in an environment using a plurality of sensors;
identify when one or more objects of the objects enter a field of view for a camera based on the monitored motion;
identify when the one or more objects leave the field of view for the camera based on the monitored motion; and
in response to identifying when the one or more objects leave the field of view for the camera, initiate a capture of at least one image by the camera.

12. The computing apparatus of claim 11, wherein the plurality of sensors comprises a plurality of cameras separate from the camera.

13. The computing apparatus of claim 11, wherein the plurality of sensors comprises a plurality of motion sensors.

14. The computing apparatus of claim 11, wherein the program instructions further direct the computing apparatus to:
determine one or more differences between the at least one image and at least one additional image, wherein the at least one additional image was captured prior to identifying when the one or more objects enter the field of view for the camera; and
update stock information for the environment based on the one or more differences.

15. The computing apparatus of claim 14, wherein the program instructions further direct the computing apparatus to generate a summary of the stock information for the environment.

16. The computing apparatus of claim 15, wherein the program instructions further direct the computing apparatus to:
determine that the stock information associated with at least one item in the environment satisfies one or more criteria; and
wherein generating the summary of the stock information for the environment occurs in response to determining that the stock information associated with the at least one item in the environment satisfies the one or more criteria.

17. The computing apparatus of claim 11, wherein the objects comprise people or robots.

18. The computing apparatus of claim 11, wherein identifying when the one or more objects leave the field of view for the camera based on the monitored motion comprises:
identifying when the one or more objects leave the field of view for a threshold period.

19. The computing apparatus of claim 11, wherein the program instructions further direct the computing apparatus to determine an update to stock information for the environment based on the image, wherein the stock information comprises quantities associated with items in the environment.

20. An apparatus comprising:
one or more computer readable storage media; and
program instructions stored on the one or more computer readable storage media that, when executed by a processing system, direct the processing system to:
monitor motion of objects in an environment using a plurality of sensors;
identify when one or more objects of the objects enter a field of view for a camera based on the monitored motion;
identify when the one or more objects leave the field of view for the camera based on the monitored motion;
in response to identifying when the one or more objects leave the field of view for the camera, initiate a capture of at least one image by the camera; and
determine an update to stock information for the environment based on the image, wherein the stock information comprises quantities associated with items in the environment.

* * * * *